United States Patent [19]

Roberts et al.

[11] Patent Number: 4,999,384

[45] Date of Patent: Mar. 12, 1991

[54] FOAMED BLENDS OF NYLON 6,I/T AND POLYCARBONATE

[75] Inventors: Daniel L. Roberts, Albany, N.Y.; G. Fred Willard, Dalton, Mass.

[73] Assignee: General Electric Company, Pittsfield, Mass.

[21] Appl. No.: 567,412

[22] Filed: Aug. 14, 1990

[51] Int. Cl.$^5$ .............................................. C08J 9/14
[52] U.S. Cl. .................................... 521/134; 521/138; 521/180; 521/183; 521/184; 525/425; 525/433
[58] Field of Search ............... 521/134, 138, 180, 183, 521/184

[56] References Cited

U.S. PATENT DOCUMENTS 4,581,382 4/1986 Liberti et al. ........................ 521/90
4,798,874 1/1989 Maresca et al. ..................... 525/425

Primary Examiner—Morton Foelak
Attorney, Agent, or Firm—Spencer D. Conard; William F. Mufatti

[57] ABSTRACT

Foamed thermoplastic blends of Nylon 6,I/T and polycarbonate resin are provided which exhibit good chemical resistance. The foamed blends are useful for making foamed articles such as chemically resistant foamed sheet.

6 Claims, No Drawings

FOAMED BLENDS OF NYLON 6,I/T AND POLYCARBONATE

BACKGROUND OF THE INVENTION

1. Field of the Invention

The present invention relates to foamed thermoplastic blends containing an aromatic polycarbonate resin and an amorphous polyamide resin. More particularly, the present invention relates to foamed thermoplastic blends of an aromatic polycarbonate resin and an amorphous polyamide derived from hexamethylene diamine, isophthalic acid and terephthalic acid.

2. Description of Related Art

Blends of polycarbonate and Nylon 6,I/T are known, see Maresca et al., U.S. Pat. No. 4,798,874, which is incorporated herein by reference. Maresca et al. discloses that the blends exhibit improved solvent resistance and substantial transparency, and that the weight ratios of amorphous polyamide to polycarbonate may be from about 1/49 to 49/1. Maresca et al. discloses that the admixture may be molded into a piece of specific dimensions or further extruded into a film or sheet product.

Polycarbonate resin foams are known, see Liberti et al., U.S. Pat. No. 4,581,382, which is incorporated herein by reference. Liberti et al. discloses various resins which can be blended with the polycarbonate.

It is desired to provide a chemically resistant polycarbonate foamed material.

Accordingly, one object of the present invention is to provide a thermoplastic foamed material exhibiting good chemical resistance.

Another object of the present invention is to provide a thermoplastic foam exhibiting chemical resistance sufficient to inhibit foam cell collapse in certain chemically harsh environments.

SUMMARY OF THE INVENTION

Foamed thermoplastic blends of an aromatic polycarbonate and Nylon 6,I/T are provided. The foamed blends exhibit sufficient chemical resistance to inhibit cell collapse in certain chemically harsh environments. For example, low density polycarbonate foam containing no Nylon 6,I/T collapses in styrene monomer. However, an 80/20 polycarbonate/Nylon 6,I/T foam survives styrene monomer with no collapse of the structure.

DETAILED DESCRIPTION OF THE INVENTION

Polycarbonate resins suitable for use herein can be prepared by reacting a dihydric phenol with a carbonate precursor, such as phosgene, a haloformate or a carbonate ester. Generally speaking, such carbonate polymers may be typified as possessing recurring structural units of the formula:

$$-O-D-O-\overset{O}{\overset{\|}{C}}- \tag{I}$$

wherein D is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. The preferred polycarbonate resin for use herein is a homopolymer derived from 2,2-bis(4-hydroxyphenyl)propane and a carbonate precursor.

These aromatic polycarbonates can be manufactured by known processes, such as, for example and as mentioned above, by reacting a dihydric phenol with a carbonate precursor, such as phosgene, in accordance with methods set forth in U.S. Pat. Nos. 4,081,750 and 4,123,436; or by transesterification processes such as are disclosed in U.S. Pat. No. 3,154,008, as well as other processes known to those skilled in the art.

The polyamides suitable for use in the present invention are polyamides derived from substantially equal mole portions of a diamine component and a dicarboxylic acid component. The diamine component is 1,6-hexamethylenediamine. The dicarboxylic acid component contains respective amounts of terephthalic acid and isphthalic acid. The dicarboxylic acid component may be used in the form of a functional derivative thereof, for example, an ester or acid chloride.

The 1,6-hexamethylenediamine may be represented by the formula:

(II)

The diamine component preferably comprises at least 95% by weight 1,6-hexamethylenediamine, more preferably about 100% by weight thereof.

The dicarboxylic acid component contains respective amounts of isophthalic acid and terephthalic acid. The isophthalic acid is preferably present at a level of from 60% to 95% by weight based on the total weight of the dicarboxylic acid component, more preferably from 65% to 85% by weight thereof, and most preferably about 65% by weight thereof. The terephthalic acid is preferably present at a level of from 5% to 40% by weight based on the total weight of the dicarboxylic acid component, more preferably from 15% to 35% by weight thereof, and most preferably about 35% by weight thereof. The isophthalic acid and terephthalic acid in combination are preferably present in a combined weight percent of at least 95% by weight based on the total weight of the dicarboxylic acid component, more preferably about 100% by weight thereof.

The resulting polyamide has first units of the formula:

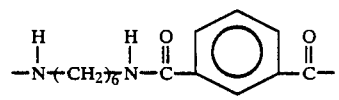

(III)

and second units of the formula:

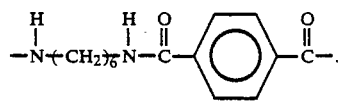

(IV)

The first units are preferably present in the polyamide at a level of about 60% to 95% by weight based on the total weight of the polyamide, more preferably from 65% to 85% by weight thereof, and most preferably about 65% by weight thereof. The second units are preferably present at a level of from 5% to 40% by weight based on the total weight of the polyamide resin, more preferably from 15% to 35% by weight thereof, and most preferably about 35% by weight thereof.

The blends of polycarbonate and polyamide preferably comprise from 10% to 90% by weight polycarbonate resin based on the total weight of the blend, more preferably from 60% to 80% by weight thereof, and most preferably about 67% by weight thereof; and the blends preferably contain 10% to 90% by weight polyamide resin based on the total weight of the blend, more preferably from 20% to 40% by weight thereof, and most preferably about 33% by weight thereof.

The above polycarbonate resin/polyamide resin blend composition may be expanded from a granular or bead form to assume a porous cellular, solidified structure by the action of various propellants or agents for expanding or blowing the materials. The blowing agents, in accordance with common practice, are usually gases, gas generating solids, or highly fugacious liquids which have been dissolved or otherwise intimately incorporated within the thermoplastic resinous material either at the extrusion or die head while the resinous material is in melt form or while the resinous material is in unexpanded granular form. Thus, the polycarbonate resin/polyamide resin blend composition may not come into contact with a blowing agent until just prior to the instant of foaming.

The blowing agents suitable for use in or with the polycarbonate resin/polyamide resin blend composition include gases which expand upon the release of pressure to foam the resin composition, liquids while will vaporize to a gas and expand the resin upon the release of pressure, solids which decompose to release a gas, and combinations of such gases, liquids, and solids. Examples of suitable normally gaseous agents which can be used are paraffins such as propane or butane and more permanent gases such as nitrogen, carbon dioxide, and air. Similarly, olefins such as ethylene, propylene, butylene, etc., and mixtures thereof can be used to advantage. Suitable normally liquid blowing agents include methyl chloride, higher paraffins such as pentane or hexane, fluorocarbons, etc. Examples of suitable solids which upon decomposition release a gas are ammonium or azo type compounds, such as ammonium carbonate, ammonium bicarbonate, potassium bicarbonate, diazoaminobenzene, diazoaminotoluene, azodicarbonamide, diazoisobutyronitrile, etc. Alcohols are preferred blowing agents and include isopropanol, ethanol and methanol. Hydrochlorofluorocarbons are also suitable blowing agents. The amount of foaming agent used depends upon the volume of gas it will generate and the foam density required.

The foaming agent may be combined with the polycarbonate resin/polyamide resin blend composition either prior to or at the instant of the actual foaming of the resin in an amount sufficient to result in the desired degree of foaming. Preferably, the foaming agent is premixed with the blend composition while in melt form and plasticated therewith.

The blend composition may be foamed by any of the common techniques in either an injection molding or extrusion operation. Generally, such techniques involve heating the polycarbonate resin/polyamide blend composition until it is in melt form and injecting the melt into a die cavity or extruding the melt through a die head with an activated blowing agent. One skilled in such techniques can easily prescribe more specific methods and conditions for foaming the polycarbonate resin/polyamide resin blend composition.

Nucleating agents such as talc should be employed in levels of from 0.1% to 1.5% by weight based on the total weight of resin. Other suitable nucleating agents may include sodium bicarbonate, citric acid and blends thereof.

The foaming process preferably involves a first extruder and second extruder. Polycarbonate resin pellets and polyamide resin pellets can be added upstream of the first extruder wherein the resins are melted and mixed together, preferably at temperatures of at least 500° F. and most preferably about 550° F., and at a pressure from about 3000 to 5000 psi, preferably about 4000 psi. Blowing agents such as isopropanol can then be added in the last half of the first extruder and admixed therein with the melted resin blend to form a plasticized blend. The plasticized blend is then transferred to the second extruder where the temperature is reduced to less than 450° F., preferably about 415° F., so that the die pressure at the exit of the second extruder is from about 800 psi to 1000 psi. The exit die has preferably a circular exit slit, providing an annular foamed extrusion which expands, is cut longitudinally, flattened and rolled into foamed sheet.

Alternatively, the foam may be extruded through a horizontal, linear, slit die to produce a flat sheet.

The resultant foam article preferably has a density of from 3 to 20 pounds per cubic foot (PCF), more preferably from 3 to 10 PCF, and most preferably about 3 to 7 PCF.

The resultant foam article has a cellular matrix derived from the blend composition. The cellular matrix preferably has at least 30% closed cells, more preferably at least 70% closed cells and most preferably at least 90% closed cells. The percent closed cells may be measured by an air comparison pycnometer (ASTM D2856).

EXAMPLES

The following examples are meant to illustrate the present invention but are not meant to limit the scope thereof.

TABLE 1—ABBREVIATIONS

PA=The polyamide employed was Nylon 6,I/T made by reacting 1,6-hexamethylenediamine with a 65/35 weight mixture of isophthalic acid and terephthalic acid.
PC=The polycarbonate employed was derived from bisphenol A and phosgene.
B1=(R22)—Chlorodifluoromethane.
B2=R(11)—Trichlorofluoromethane.
B3=60/40 R22/R142B—Chlorodifluoromethane/1,1,1-chlorodifluoroethane.
PP=Primary pressure in first extruder.
DP=Die pressure at exit of second extruder.
MT=Melt temperature at the exit die of the second extruder.
FDN=Foam density in pounds per cubic foot.
CC=% closed cells (defined as measured by an air comparison pycnometer (ASTM D2856)).
NRDN=Neat resin density in pounds per cubic foot.

EXAMPLES

| Example | PA/PC (Weight %)[b] | NRDN | Blowing Agent Type/(Weight %)[a] | Talc (Weight %) | PP (psi) | DP (psi) | MT(°F.) | FDN(pcf) | CC(%) |
|---|---|---|---|---|---|---|---|---|---|
| 1 | 33/67 | 74.0 | B1/(2.7%) | 0.2 | 4080 | 970 | 416 | 22.6 | 28.5 |
| 2 | 33/67 | 74.0 | B2/(2.0%) | 0.2 | — | — | — | — | — |
| 3 | 33/67 | 74.0 | B3/(2.0%) | 0.2 | 3420 | 980 | 422 | 15.5 | 27.5 |
| 4 | 33/67 | 74.0 | B3/(2.0%) | 0.2 | 4470 | 800 | 414 | 9.7 | 35.5 |
| 5 | 33/67 | 74.0 | B3/(2.5%) | 0.2 | — | — | 410 | 12.0 | — |

• The resultant products were a rigid foam.
• Post Expansion - A sample of 9.7 pcf foam measuring 110 to 125 mils thickness was thermally expanded in an oven at 155° C. to 130 to 150 mils thickness for a calculated density of 8.1 pcf.
[a]Wt % blowing agent is based on the total weight of resin.
[b]Wt % are based on the total weight of resin.

What is claimed:

1. A rigid foam article comprising:
   (a) a cellular matrix derived from a blend composition comprising an aromatic polycarbonate resin and a polyamide resin, said polyamide resin being derived from 1,6-hexamethylenediamine, isophthalic acid and terephthalic acid.

2. The article of claim 1 wherein said cellular matrix has an average density of from 3 to 20 pounds per cubic foot.

3. The article of claim 2 wherein said polyamide is present at a level of from 10% to 90% by weight based on the total weight of the composition, said polycarbonate being present at a level of from 10% to 90% by weight based on the total weight of the composition, said polycarbonate and polyamide being present at a combined level of from 95% to 99% by weight based on the total weight of the composition.

4. The article of claim 3 wherein said isophthalic acid and terephthalic acid are in a weight ratio of from 60/40 to 85/15.

5. A rigid foam article comprising:
   (a) a cellular matrix derived from a blend composition consisting essentially of aromatic polycarbonate resin and a polyamide resin, said polyamide resin being derived from 1,6-hexamethylenediamine, isophthalic acid and terephthalic acid.

6. The article of claim 5 wherein said cellular matrix has an average density of from 3 to 20 pounds per cubic foot.

* * * * *